UNITED STATES PATENT OFFICE

2,317,181

UREA - FORMALDEHYDE - TRIETHANOLAMINE HYDROCHLORIDE CONDENSATION PRODUCT

Gaetano F. D'Alelio, Pittsfield, Mass., assignor to General Electric Company, a corporation of New York No Drawing. Application August 9, 1939, Serial No. 289,280

3 Claims. (Cl. 260—70)

This invention relates to new condensation products and to methods of making the same. The invention is concerned more particularly with self-curing aminoplasts by which are meant heat-convertible resinous condensation products prepared from amino or amido compounds and having the inherent characteristic of curing under heat or under heat and pressure to the insoluble, infusible state without the addition of a curing accelerator or catalyst. Specifically the invention is concerned with the production of a heat-hardenable molding composition comprising a filler, more particularly a cellulosic filler, and a heat-hardenable resinous condensation product of ingredients comprising the following components in the stated molar ratios: (1) 1 mole urea, (2) from 1½ to 2½ moles formaldehyde, e. g., approximately 2 moles formaldehyde, and (3) not exceeding substantially ¼ mole triethanolamine hydrochloride. It is an inherent characteristic of such a molding composition that it cures rapidly at molding temperature and has more plasticity during molding than a similar composition wherein an equivalent molar amount of mono- or di-ethanolamine hydrochloride is used in the preparation of the resinous condensation product but which otherwise is the same.

In the production of aminoplasts it has heretofore been common practice in converting such materials to the insoluble, infusible state to incorporate into the condensation product or into the molding composition a latent or active (direct) curing catalyst. As pointed out more particularly hereafter, this technique and the final products have not been wholly satisfactory.

I have discovered that self-curing aminoplasts can be produced by condensing ingredients comprising a urea, an aliphatic aldehyde, for example formaldehyde, and aminoalcohol salts such as hereafter more particularly identified. The initial condensation may be carried out at normal or at elevated temperatures, in the presence or absence of a condensation catalyst under conditions hereinafter more fully described.

The aminoalcohol salts used in practicing this invention are the organic and inorganic salts of aminoalcohols. An example of such an aminoalcohol salt is diethanol amine acetate

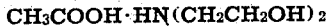

The aminoalcohol salts used in practicing this invention are aldehyde-reactable and may be obtained by treating an aminoalcohol with an organic or inorganic acid.

Illustrative of the organic and inorganic acids which may be used in preparing aminoalcohol salts are hydrochloric, hydrobromic, hydrofluoric, hydroiodic, nitric, sulfuric, phosphoric, boric, selenic, chromic, acetic, propionic, butyric, valeric, formic, caproic, acrylic, methacrylic, oxalic, malonic, succinic, glutaric, adipic, lactic, citric, tartaric, maleic, malic, fumaric, itaconic, citraconic, propane tricarboxylic, benzoic, phthalic, salicylic, hexahydrobenzoic, etc. Illustrative of the amino alcohols which may be used with the above acids are: ethanol amine, diethanol amine, tri-ethanol amine, propanol amine, dipropanol amine, tripropanol amine, isopropanol amine, diisopropanol amine, triisopropanol amine, choline, isocholine, neurine, 1-amino-4-butanol, diacetone alkamine, etc.

The urea component may be, for instance, urea ($NH_2CONH_2$) itself; thiourea; iminourea (guanidine); aldehyde-reactable substituted ureas, thioureas and iminoureas such as methyl urea, acetyl urea, benzoyl urea, phenyl thiourea, asymmetrical diethyl urea, allyl urea, 2-chloroallyl urea, ethylidene urea, methylol urea, methylene urea, dicyandiamide, guanylurea, guanylthiourea, biguanidine, aminoguanidine, creatine (guanidine methyl glycine) and guanoline (guanido carbonic ethyl ester). Terms such as "a urea", "urea component" and "urea substance", as used generally herein and in the appended claims, are intended to include within their meaning substances of the kind above mentioned. Other examples of aldehyde-reactable compounds that may be used are creatinine, aminotriazoles, ethylene pseudosulfocarbamide derivatives, sulfohydantoin and aldehyde-reactable triazine derivatives.

In producing the new condensation products, which may be described more specifically as co-condensation products, the choice of the aliphatic aldehyde component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aliphatic aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention. It is more advantageous that the condensation is concluded under neutral or alkaline conditions and, surprisingly, resins with excellent cure and other characteristics are obtained.

In obtaining the neutral, alkaline or acid conditions above described I may use, for example, ammonia, sodium hydroxide, or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all of the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the aminoalcohol salt to a partial condensation product of a urea and an aliphatic aldehyde and effect further condensation between the components. Or, I may first condense the aminoalcohol salt with aliphatic aldehyde, add the resulting product to a urea-aliphatic aldehyde partial condensation product and then cause the reaction to proceed further. Or, I may condense or partially condense the aminoalcohol salt with a mole excess of an aliphatic aldehyde, add a urea to this condensation product and effect further reaction between the components. Still other ways may be employed in combining the components and in producing the unmodified or modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric, or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses are self-convertible under heat or under heat and pressure to the insoluble infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface coating materials, in the production of paints, varnishes, lacquers, enamels, etc., for general adhesive applications, as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

Example 1

| | Parts |
|---|---|
| Urea | 60.0 |
| Aqueous ammonia (28%) | 7.5 |
| Aqueous formaldehyde-neutral (37.1%) | 161.0 |
| Aqueous triethanolamine hydrochloride—10% | 10.0 |

The above reactants were mixed and heated under reflux for 2 minutes. The resulting clear syrup obtained was alkaline to litmus. The syrup was mixed with 70 parts alpha flock and 0.4 part zinc stearate to form a molding composition. The compound was dried and then molded at 130° C. and 2000 pounds per square inch pressure to obtain well cured molded articles. A monoalcoholamine salt, such as ethanolamine acetate, may be used instead of the triethanolamine hydrochloride.

Example 2

| | Parts |
|---|---|
| Urea | 60.0 |
| Aqueous formaldehyde-neutral (37.1%) | 161.0 |
| Sodium hydroxide in 10 parts water | 0.04 |
| Aqueous triethanolamine hydrochloride—10% | 10.0 |

The above reactants were mixed and heated under reflux for 2 minutes. The resulting clear hot syrup obtained was alkaline to litmus. The syrup was mixed with 70 parts alpha flock and 0.4 part zinc stearate and dried at 50° C. for 16 hours. The compound when hardened under heat and pressure gave well cured molded products similar to those obtained in Example 1. In both cases the compounds had good plastic flow.

Example 3

| | Parts |
|---|---|
| Urea | 60.0 |
| Aqueous formaldehyde-neutral (37.1%) | 161.0 |
| Aqueous ammonia (28%) | 7.5 |
| Sodium hydroxide in 10 parts water | 0.04 |
| Aqueous diethanolamine hydrochloride—10% | 20.0 |

All of the reactants with the exception of the diethanolamine hydrochloride were mixed and heated under reflux for 25 minutes. To this partial condensation product was added the above stated amount of diethanolamine hydrochloride. The mixture was compounded with 70 parts alpha flock and 0.4 part zinc stearate. The mixture was heated at 50° C. to effect condensation simultaneously with drying. The molding compound was subjected to heat and pressure to form molded articles which were well-cured.

Example 4

| | Parts |
|---|---|
| Urea | 60 |
| Aqueous formaldehyde-technical (37.1%) | 161 |
| Aqueous ammonia (28%) | 15 |
| Aqueous diethanolamine hydrochloride—10% | 10 |

The above reactants with the exception of the polyalcoholamine salt were mixed and heated under reflux for 30 minutes. To this product of partial condensation was added 70 parts alpha flock and 0.4 part zinc stearate. The mixture thus obtained was dried at 50° C. and the aqueous solution of diethanolamine hydrochloride was added. Ethyl alcohol was added to facilitate mixing, the composition was again heated at 50° C. to effect condensation simultaneously with drying. The molding compound thus obtained was subjected to pressure of 2000 pounds per square inch at 130° C. to form well cured molded products.

Example 5

| | Parts |
|---|---|
| Urea | 60 |
| Aqueous formaldehyde-neutral (37.1%) | 161 |
| Aqueous triethanolamine hydrochloride—10% | 5 |

The above reactants were mixed and heated under reflux for 2 minutes. The syrup obtained did not show an acid reaction to litmus. The syrup was mixed with 70 parts alpha flock and 0.4 parts zinc stearate to form a molding composition. The compound was dried at 50° C. and molded under heat and pressure to form well cured molded pieces.

Example 6

| | Parts |
|---|---|
| Urea | 60.0 |
| Aqueous formaldehyde-neutral (37.1%) | 161.0 |
| Hydrochloric acid in 10 parts water | 0.036 |
| Aqueous triethanolamine hydrochloride—10% | 10.0 |

The above reactants with the exception of the aminoalcohol inorganic salt were mixed and heated under reflux for 2 minutes. The syrup was converted to an alkaline condition with sodium hydroxide (0.4 part). The aqueous solution of triethanolamine hydrochloride was added to the syrup. The syrup was still alkaline to litmus. The syrup was again heated under reflux for 6 minutes to effect further condensation. The resulting hot syrup was still alkaline to litmus. It was then mixed with 70 parts alpha flock and 0.4 part zinc stearate to form molding compositions. The compound was dried at 50° C. and when molded under heat and pressure formed molded products which were well cured.

Example 7

| | Parts |
|---|---|
| Urea | 60.0 |
| Aqueous ammonia (28%) | 7.5 |
| Aqueous formaldehyde-neutral (37.1%) | 161.0 |
| Aqueous diethanolamine hydrochloride—10% | 10.0 |

The above reactants were mixed and heated under reflux for 2 minutes. The resulting clear hot syrup was mixed with 70 parts alpha flock and 0.4 part zinc stearate to form a molding composition. The compound was dried at 50° C. and molded under heat and pressure to form hard, well cured articles.

Example 8

| | Parts |
|---|---|
| Urea | 60 |
| Aqueous formaldehyde-neutral (37.1%) | 161 |
| Aqueous acetic acide (10%) | 1 |
| Aqueous diethanolamine hydrochlaride—10% | 10 |

The above reactants, with the exception of the aminoalcohol salt, were mixed and heated under reflux for 10 minutes. The partial condensation product was then neutralized and made alkaline with sodium hydroxide. The aqueous solution of diethanolamine hydrochloride was added to this mixture. 70 parts alpha flock and 0.4 part zinc stearate were mixed with the syrup to form a molding composition. The mixture was heated at 50° C. to effect drying simultaneously with condensation. The molding compound was molded at 130° C. and 2000 pounds per square inch pressure to form hard, well cured molded articles.

Condensation products of urea and formaldehyde alone, prepared as described under Examples 1-4, inclusive, but not inter-condensed with the specific aminoalcohol salt mentioned in the individual example are heat-non-convertible. That is, they will not cure under heat or under heat and pressure to the insoluble infusible state.

It will be understood, of course, that the aminoalcohol salts mentioned in the above examples are only by way of illustration and that any other aminoalcohol salt may be used in carrying this invention into effect. Additional examples of such salts are:

$HOCH_2CH_2NH_2 \cdot C_2H_5COOH$ ethanol amine acetate $(HOCH_2CH_2NH_2)_2 \cdot (COOH)_2$ ethanol amine oxalate $HOCH_2CH_2NH_2 \cdot CH_2=CHCOOH$ ethanol amine acrylate $HOCH_2CH_2NH_2 \cdot CH_2=C-COOH$
              $|$
              $CH_3$ ethanol amine methacrylate $(HOCH_2CH_2NH_2)_2 \cdot H_2SO_4$ ethanol amine sulfate $(HOCH_2CH_2NH_2)_3 \cdot H_3PO_4$ ethanol amine phosphate $(HOCH_2CH_2)_2NH \cdot HBr$ diethanol amine hydrobromide $[(HOCH_2CH_2)_2NH]_2 \cdot H_2SO_4$ diethanol amine sulfate $(HOCH_2CH_2)_2NH \cdot CH_2=CHCOOH$ diethanol amine acrylate $(HOCH_2CH_2)_2NH \cdot CH_2=C-COOH$
              $|$
              $CH_3$ diethanol amine methacrylate $[(HOCH_2CH_2)_2NH]_2 \cdot \begin{array}{c} CHCOOH \\ \| \\ CHCOOH \end{array}$ diethanol amine maleate $[(HOCH_2CH_2)_2NH]_2 \cdot (CH_2CH_2COOH)_2$ diethanol amine adipate $[(HOCH_2CH_2)_2NH]_2 \cdot C_6H_4(COOH)_2$ diethanol amine phthalate $(HOCH_2CH_2)_3N \cdot HBr$ triethanol amine hydrobromide $(HOCH_2CH_2)_3N \cdot HF$ triethanol amine hydrofluoride $(HOCH_2CH_2)_3N \cdot HNO_3$ triethanol amine nitrate $(HOCH_2CH_2)_3N \cdot HOC_6H_4COOH$ triethanol amine salicylate $[(HOCH_2CH_2)_3N]_3 \cdot H_3PO_4$ triethanol amine phosphate It also will be understood that in each of the specific aminoalcohol salts above mentioned the particular acid used in forming the salt and shown in any specific formula may be replaced by some other acid, care being taken in the choice of the acid in the light of the properties desired in the final products. For example, when light-colored molded articles are desired, the use of iodide salts of aminoalcohols should be avoided.

Where a plurality of amino salt groups are present in the alcohol molecule, these may be the same or different. For example, one hydrohalogen salt group in the molecule may be hydrogen chloride and another hydrogen bromide. In this may it is possible to obtain a heat-convertible resin of self-curing characteristics and other properties best adapted to meet a particular molding problem and service application of the finished article.

In certain cases, it may be advantageous to use a single aminoalcohol salt with a plurality of urea substances. Thus, to modify the characteristics of the molded product I may used a mixture of, for example, a thiourea and a triazine derivative, or urea and dicyandiamide, with a single aminoalcohol salt. In other cases, instead of using a single aminoalcohol salt, I may use a plurality of aminoalcohol salts with a single urea substance or with a plurality of urea substances.

The ratio of the reactants to each other may be considerably varied, but in general, it is desirable to use at least one mole of an aliphatic aldehyde for each mole of mixed (total) urea substance and aminoalcohol salt. In producing the heat-convertible resinous condensation products of this invention, the proportion of the aminoalcohol salt in all cases is at least sufficient to impart self-curing characteristics to the resin. Ordinarily not exceeding substantially ¼ mole of aminoalcohol salt is used for each mole of urea substance. No advantage accrues from using an amount of aminoalcohol salt above the minimum required to secure the desired curing rate. Further, the use of higher amounts of aminoalcohol is undesirable for most applications because of the greater difficulty in obtaining molded articles of suitable hardness, but may not be objectionable for other applications of the material. Also, in some cases, particularly where high molecular weight aminoalcohol salts as for example, aminooctadecanol hydrobromide are used, the aminoalcohol salt portion of the resin molecule exceeds on a weight basis the urea portion of the molecule. Consequently, in such cases the inherent characteristics (for example, waxy nature) of the high molecular weight aminoalcohol salt predominate in the resin molecule. This may be objectionable in some applications of the molded part, for instance where resistance to the ordinary organic solvents is required.

From the foregoing it will be seen that the particular mole ratio of aminoalcohol salts to the other components is dependent somewhat upon the inherent characteristic of the aminoalcohol salt and the curing characteristics and other properties desired in the heat-convertible and heat-hardened resinous condensation products. For molding applications the ratio of the aliphatic aldehyde to urea substance may be considerably varied, but generally will be within the range of 1½ to 2½ moles aliphatic aldehyde for each mole of urea substance. No particular advantage ordinarily accrues from the use of higher amounts of aldehyde. Approximately 2 moles aliphatic aldehyde per mole urea substance usually gives very satisfactory results, particularly from the view-point of optimum yields of condensation product per unit cost.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; momoamides such as formamide, acetamide, stearamide, acrylic acid amides (acryloamides), benzamide, toluene sulfonamide, etc.; polyamides such as adipic diamide, phthalamide, and the like; amines such as ethylene diamine, aniline, phenylene diamine, amino phenols, etc.

The modifying bodies also may take the form of high molecular weight bodies, with or without resinous characteristics, for example hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricrysl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets, or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric, or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified or unmodified products of this invention have a wide variety of other uses, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels, for bonding or cementing together mica flakes to form a laminated mica article. They also may be used in making laminated fibrous sheet material wherein superposed layers of cloth or paper are firmly bonded together with the resin, as impregnants for electrical coils and other electrical devices, and for other purposes.

What I claim as new and desire to secure by Letters Patent of the United States is:

1. A heat-hardenable molding composition comprising a filler and a heat-hardenable resinous condensation product of ingredients comprising the following components in the stated molar ratios: 1 mole urea, from 1½ to 2½ moles formaldehyde and not exceeding substantially ¼ mole triethanolamine hydrochloride, said molding composition curing rapidly at molding temperature and having more plasticity during molding than a similar composition wherein an equivalent molar amount of mono- or di-ethanolamine hydrochloride is used in the preparation of the resinous condensation product but which otherwise is the same.

2. A heat-hardenable molding composition comprising a cellulosic filler and a soluble, fusible resinous condensation product of ingredients comprising the following components in the stated molar ratios; 1 mole urea, approximately 2 moles formaldehyde and not exceeding substantially ¼ mole triethanolamine hydrochloride, said molding composition curing rapidly at molding temperature and having more plasticity during molding than a similar composition wherein an equivalent molar amount of mono- or di-ethanolamine hydrochloride is used in the preparation of the resinous condensation product but which otherwise is the same.

3. An article of manufacture comprising the heat- and pressure-hardened molding composition of claim 1.

GAETANO F. D'ALELIO.

CERTIFICATE OF CORRECTION.

Patent No. 2,317,181. April 20, 1943.

GAETANO F. D'ALELIO.

It is hereby certified that error appears in the printed specification of the above numbered patent requiring correction as follows: Page 3, second column, line 16, for "parts" before "zinc" read --part--; line 62, for "acide" read --acid--; line 63, for "hydrochlaride" read --hydrochloride--; page 4, first column, line 52, for "$[HOCH_2CH_2)$" read --$[(HOCH_2CH_2)$--; and second column, line 10, for "may" read --way--; line 26, after "but" insert a comma; page 5, first column, line 8, for "momoamides" read --monoamides--; line 29, after "superpolyamides" and before the period insert --, etc--; line 36, for "tricrysl" read --tricresyl--; and second column, line 39, for "impregants" read --impregnants--; line 62, for "raties" read --ratios--; and that the said Letters Patent should be read with this correction therein that the same may conform to the record of the case in the Patent Office.

Signed and sealed this 15th day of June, A. D. 1943.

(Seal)

Henry Van Arsdale,
Acting Commissioner of Patents.